United States Patent [19]
Newman et al.

[11] Patent Number: 6,070,895
[45] Date of Patent: Jun. 6, 2000

[54] HIGH EFFICIENCY BICYCLE SEAT SUSPENSION

[76] Inventors: William Michael Newman, 80 Winston Circle, Pointe Claire, Québec, Canada, H9S 4X6; Kip Hugh Munro, 1743 Claret St., St. Lazare, Québec, Canada, J0P 1V0

[21] Appl. No.: 08/820,179

[22] Filed: Mar. 19, 1997

[30] Foreign Application Priority Data

Mar. 25, 1996 [CA] Canada ................................. 2172569

[51] Int. Cl.⁷ .................................................. B62K 1/00
[52] U.S. Cl. ........................................................ 280/283
[58] Field of Search .................................... 280/283, 275; 267/115, 118, 120, 124, 140.11; 248/631, 644

[56] References Cited

U.S. PATENT DOCUMENTS

| | | |
|---|---|---|
| 568,593 | 9/1896 | Watson . |
| 3,891,236 | 6/1975 | Kuwano et al. . |
| 4,934,724 | 6/1990 | Allsop ..................................... 280/275 |
| 5,044,648 | 9/1991 | Knapp . |
| 5,324,058 | 6/1994 | Massaro . |
| 5,367,978 | 11/1994 | Mardikian .............................. 114/363 |
| 5,370,351 | 12/1994 | Chen . |
| 5,382,039 | 1/1995 | Hawker . |
| 5,405,159 | 4/1995 | Klein . |
| 5,553,880 | 9/1996 | McJunkin . |

FOREIGN PATENT DOCUMENTS

| | | |
|---|---|---|
| 2693424 | 1/1994 | France . |
| 88 06 577 | 9/1989 | Germany . |
| 660 574 | 5/1987 | Switzerland . |
| WO 97/20725 | 6/1997 | WIPO . |

*Primary Examiner*—Matthew C. Graham
*Assistant Examiner*—C. T. Bartz

[57] ABSTRACT

A suspension device for use in mounting a bicycle seat on a bicycle frame. The device has an upper guide member telescopically, non-rotatability mounted in a lower guide member. An air cushion is provided between the guide members for use in cushioning movement of the guide members toward each other. First connecting members are provided on the upper portion of the upper guide member for use in connecting a bicycle seat to the upper member. Second connecting members are provided on the front, top of the lower guide member for use in connecting the lower guide member to a seat post with the lower guide member affixed in cantilever fashion, behind the seat post. The seat post is adapted to be mounted on the bicycle frame. The second connecting members are adjustably mounted to the lower guide member and the upper portion of the guide member extends at an angle of between fifty and seventy fifty degrees to the second connecting members. The invention also covers a suspension system and a bicycle incorporating the suspension device.

21 Claims, 6 Drawing Sheets

SECTION 3 – 3

HIGH EFFICIENCY BICYCLE SEAT SUSPENSION

BACKGROUND OF THE INVENTION

1. Field of the Invention

This invention is directed toward a bicycle seat suspension device. The invention is more particularly directed toward a bicycle seat suspension device connectedly interposed between a bicycle seat and a bicycle frame. The invention is also directed toward a bicycle incorporating the bicycle seat suspension device.

2. Description of the Related Art Including Information Disclosed Under CFR §§ 1.97–1.99

Various types of bicycle seat suspension devices are known. Most of the known seat suspension devices employ resilient means such as a spring mounted between the seat and a seat post tube forming part of the frame of the bicycle. The spring can be mounted within the seat post tube as shown in U.S. Pat. No. 5,370,351 by way of example, or it can be mounted in a seat post extending down from the seat which seat post, in turn, is mounted in the seat post tube as shown in U.S. Pat. No. 5,382,039 by way of example. The spring can be combined with fluid damping means as shown by U.S. Pat. Nos. 568,593, 3,891,236 and 5,324,058 by way of example.

The known suspension devices have many disadvantages however and have not been widely used. The main disadvantage of known bicycle seat suspensions is that they have their angle of operation restricted to the direction of the seat post and the seat post tube in which the seat post is mounted. The angle of operation is defined as the angle, in the plane of the bicycle, of the operational travel of the suspension device. This angle of operation differs significantly from the direction of the shock generated when the rear wheel of a bicycle rides over bumps. The direction of the shock is upwardly and forwardly through the seat to the torso of the rider whereas the angle of operation of the known suspension devices is directed upwardly and rearwardly and thus the known suspension devices do not efficiently absorb the shock. Another disadvantage in having the known seat suspension devices mounted within the seat post or the seat post tube is that they are generally aligned with the direction of pedaling generated forces which forces can induce unwanted oscillations in the suspension device.

Known seat suspension devices also have relatively high coefficients of static friction. This causes them to transmit uncomfortable vibrations. In addition, the known suspension devices, particularly those employing springs, utilize relatively large amounts of kinetic friction in damping or shock absorption. The energy dissipated in the kinetic friction must be provided by the cyclist leaving less energy available for propulsion. This makes these suspension devices less acceptable for the cyclists.

Many of the known seat suspension devices are also difficult to install. Most can not be easily installed on existing bicycles without making extensive and expensive modifications to the bicycles. Most also cannot be easily be adjusted, when installed, to fit the weight of the rider using the suspension device. Many also are quite complex in construction and thus relatively expensive to purchase.

SUMMARY OF THE INVENTION

It is the purpose of the present invention to provide an improved bicycle seat suspension device that can be mounted on a bicycle in a manner to provide greatly improved isolation for the rider from shock and vibrations and which has minimal damping which reduces the energy the cyclist must employ in providing a smooth ride. It is a further purpose of the present invention to provide a relatively simple and inexpensive seat suspension device for bicycles. It is another purpose of the present invention to provide a seat suspension device for bicycle seats that can be easily mounted on existing bicycles. Another purpose of the present invention is to provide an improved seat suspension device with a lower coefficient of static friction that reduces vibrations transmitted by the suspension. A further purpose of the present invention is to provide an improved seat suspension device that can be easily adjusted to the weight of the rider. Yet another purpose of the present invention is to provide an improved seat suspension device that has a relatively linear spring rate providing a system with a low frequency of resonance.

In accordance with the present invention there is provided an improved seat suspension device having upper and lower telescoping guide members with cushioning means between them. First mounting means are provided on the upper guide member for use in mounting a bicycle seat on top of the member. Second mounting means are provided on the front of the upper portion of the lower guide member for use in mounting the lower guide member to a seat post, the lower guide member being located behind the seat post when mounted thereon. The seat post, in turn, is adapted to be mounted in a seat post tube on a bicycle frame. The lower guide member is preferably adjustably mounted on the second mounting means allowing its angle to the vertical, when mounted on the seat post, to be adjusted to best cushion the rider. The lower guide member is normally mounted to have the upper and lower guide members slope forwardly at an angle of operation ranging between fifteen degrees and forty degrees to the vertical, and preferably at about thirty degrees when the seat post is mounted on the bicycle frame.

The cushioning means provided between the two telescopic guide members is an air chamber filled with air under pressure. A reservoir chamber is connected to the air chamber through a normally open valve. When the upper guide member moves toward the lower guide member, the air flows from the air chamber into the reservoir chamber through the normally open valve providing the suspension device with a generally linear spring rate. The guide members are sized to provide a fairly long travel distance between the members before bottoming would occur to provide this generally linear spring rate. The generally linear spring rate provides a relatively low frequency of resonance and more efficient operation in isolating the rider from shock and vibration.

The normally open valve will close if a large bump is encountered to prevent bottoming of the suspension. A by-pass between the air and reservoir chambers will provide damping.

The improved seat suspension device is provided with elongated bearings between the guide members to minimize friction between the members thus reducing static friction and minimizing the transmissions of unwanted vibrations through the system to the rider.

Inlet valve means are provided on the device for pressurizing the air chamber. The air chamber is pressurized to the weight of the rider to allow the guide members to floating support the rider without having the guide members easily bottoming out.

The suspension device is easily installed on a bicycle with the first connecting means on top of the upper guide member having mounting means adapted for receiving the standard mounting means on a bicycle seat and the second connecting means on the lower guide member having, at its front end, mounting means adapted for mounting on the standard seat mounting on the top of a seat post.

The invention is particularly directed toward a suspension device for use in mounting a bicycle seat on a bicycle frame to cushion movement of the seat relative to the frame. The suspension device has first connecting means for use in connecting a bicycle seat to the top of the suspension device; and second connecting means on the front of the suspension device below the first connecting means for use in connecting the suspension device to a seat post, with the suspension device located behind the seat post when connected thereto. The seat post is adapted to be mounted on the bicycle frame.

The invention is more particularly directed toward a suspension device where the second connecting means is adjustably mounted to the suspension device, the top portion of the suspension device extending at an angle of between fifty degrees and seventy five degrees to the second connecting means.

The invention is also particularly directed toward a bicycle having a frame with an upwardly, slightly rearwardly, extending seat post tube, a front and rear wheel mounted on the front and rear of the frame, a bicycle seat, and a suspension device mounting the seat onto the seat post tube. First connecting means are provided on the top of the suspension device for use in connecting the seat to the suspension device and second connecting means are provided on the front of the suspension device, below the first connecting means, for use in connecting the suspension device to a seat post, the suspension device located behind the seat post when connected thereto. The seat post is mounted within the seat post tube on the frame. The suspension device slopes forwardly at an angle to the vertical ranging between fifteen and forty degrees.

DESCRIPTION OF THE PREFERRED EMBODIMENTS

Figure 1:
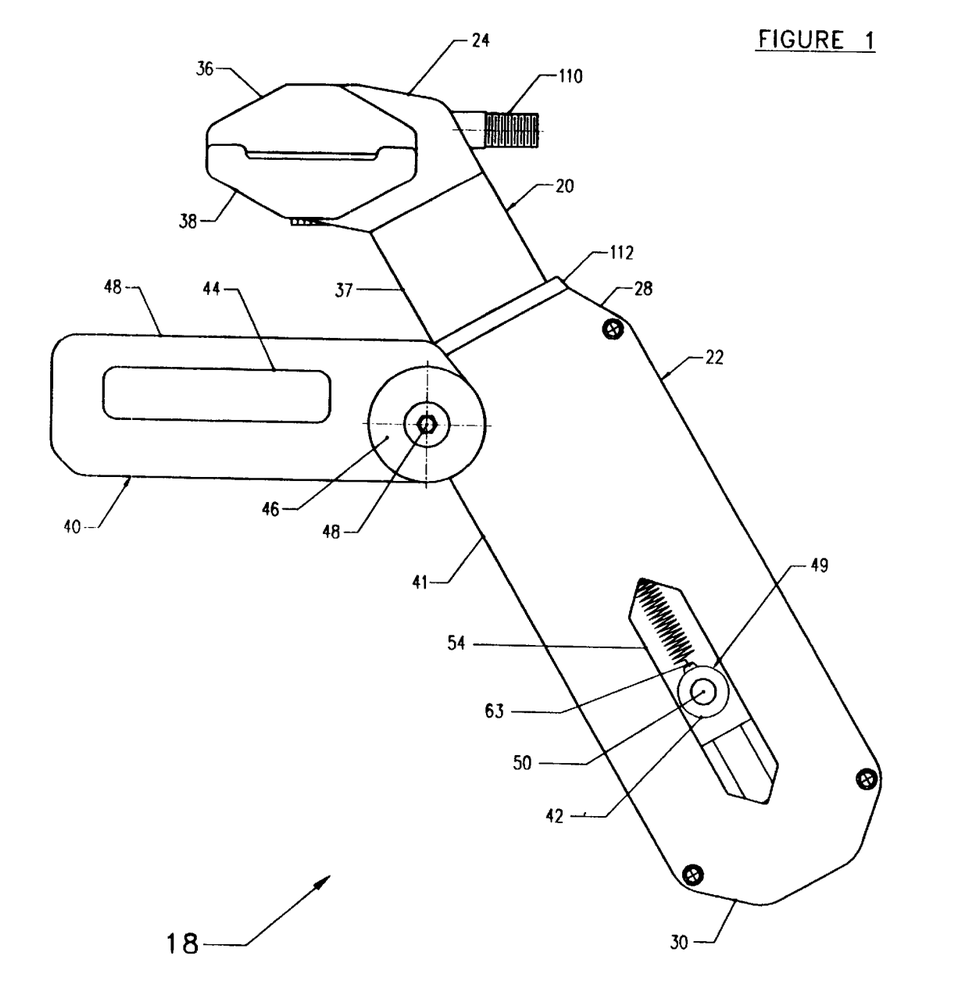
FIG. 1 is a side view of the seat suspension device of the invention.
Figure 2:
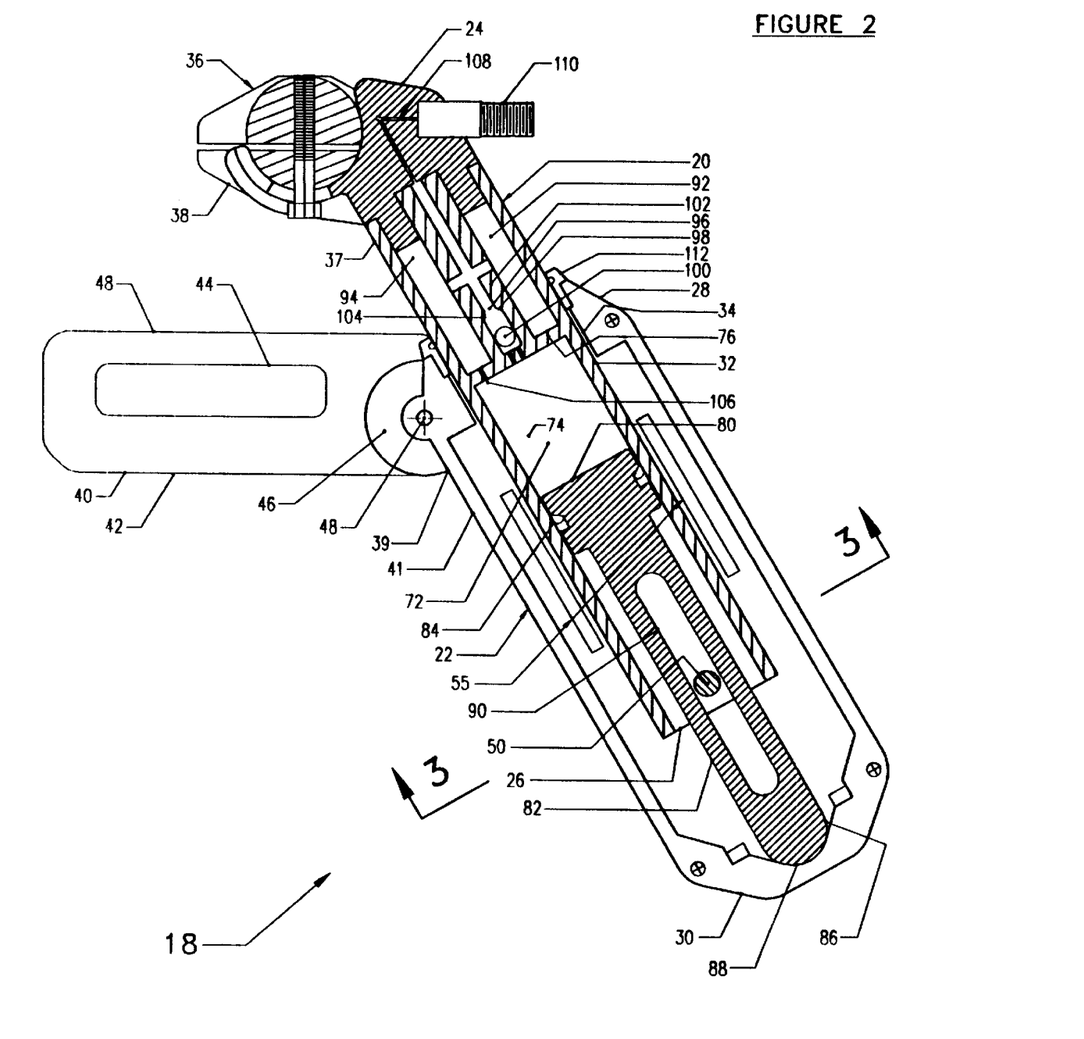
FIG. 2 is a longitudinal cross-section view of the seat suspension device.

The seat suspension device 18, shown in FIGS. 1 and 2, has an upper, tubular, guide member 20 which is telescopically and non-rotatably mounted within a lower, tubular, guide member 22. The upper guide member 20 preferably has a closed top end 24 and an open bottom end 26. The lower guide member 22, which is preferably formed from two halves, has an open top end 28 and a closed bottom end 30. The lower portion of the upper guide member 20 is slidably mounted within the upper portion of the bottom guide member 22.

Figure 3:
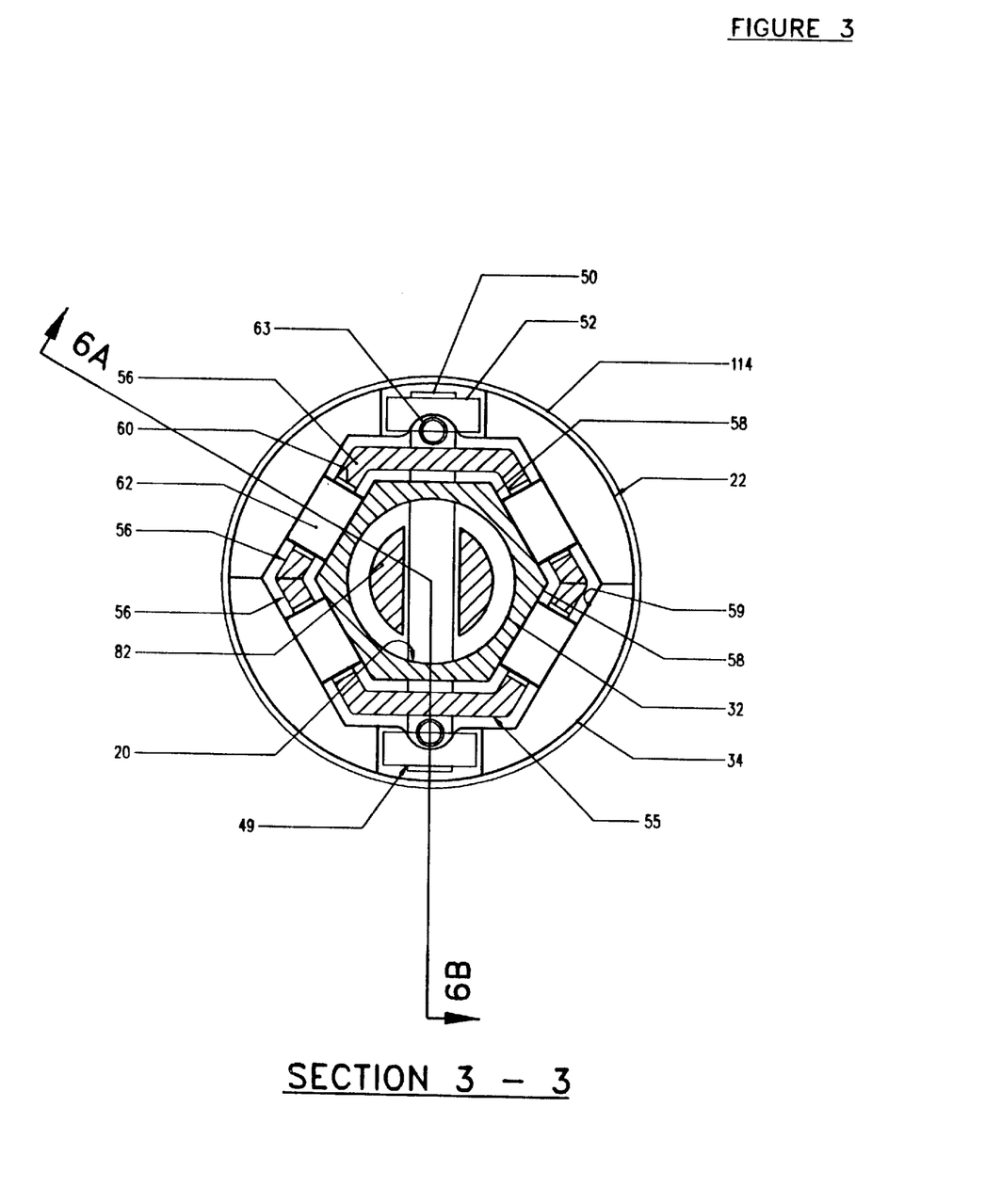
FIG. 3 is a cross-section view taken along line 3—3 in FIG. 1.

As may be seen in FIG. 3, the upper guide member wall 32 and the lower guide member wall 34 are tubular. The upper and lower guide member walls 32, 34 preferably have a hexagonal cross-sectional shape to prevent rotation of the telescoping guide members 20, 22 relative to each other.

Figure 4:
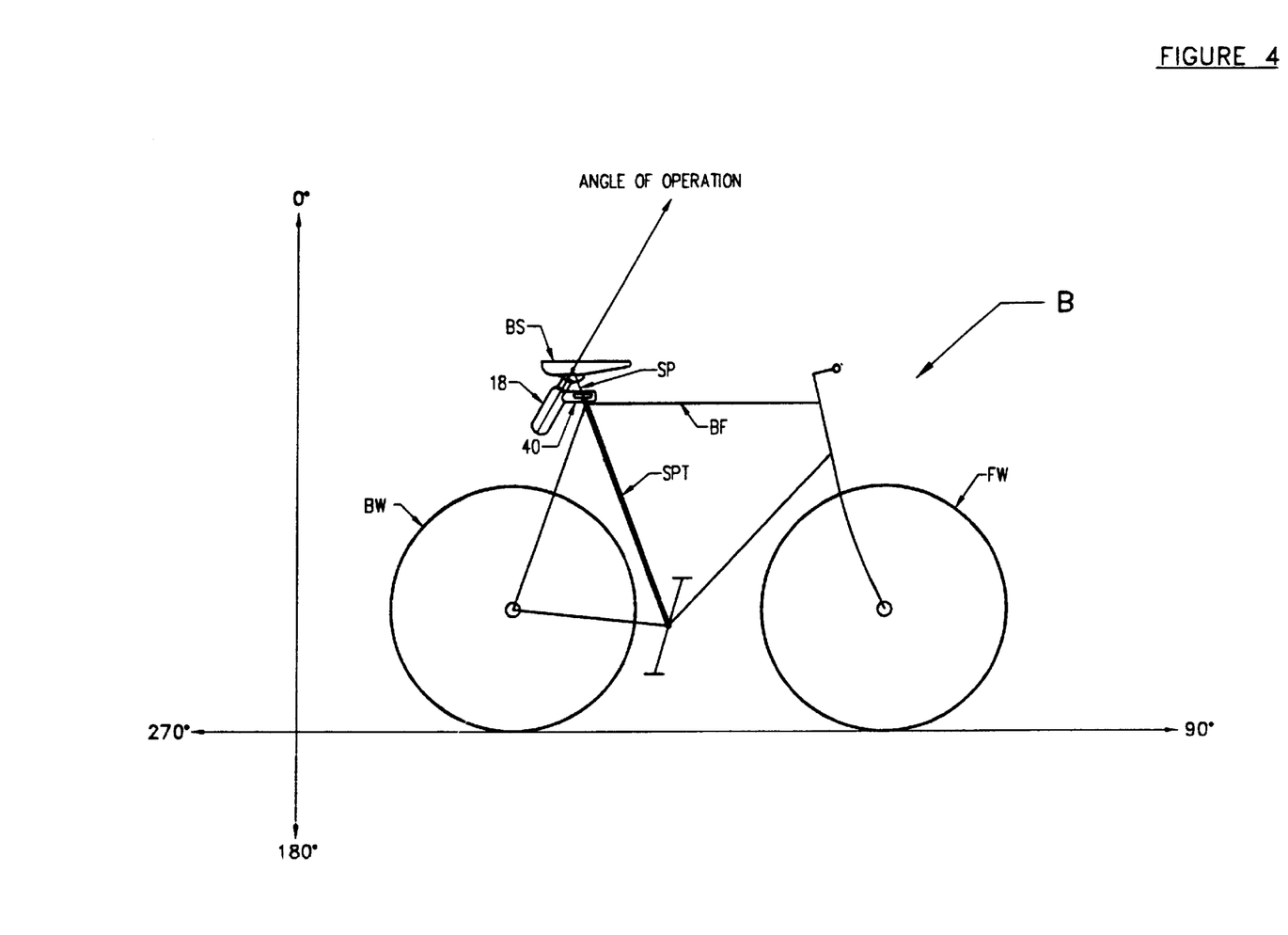
FIG. 4 is a side view of a bicycle incorporating the seat suspension device.

Referring again to FIGS. 1 and 2, and to FIG. 4, first connecting means 36 are provided on the upper portion 37 of the upper guide member 20 for use in connecting the suspension device 18 to a bicycle seat. The first connecting means 36 can comprise a clamp 38 mounted on the upper portion 37 of the upper guide member 20, the clamp 38 connectable to rails (not shown) of a bicycle seat BS. The angle of the clamp 38, and thus of the seat BS, can be adjusted.

Second connecting means 40 are provided for use in connecting the suspension device 18 to a bicycle B having a bicycle frame BF, with front and back wheels FW, BW mounted on the bicycle frame BF as shown in FIG. 4. More particularly, the second connecting means 40 connect the suspension device 18 to a seat post SP, which in turn is mounted in a seat post tube SPT on the bicycle frame BF. The second connecting means 40 are provided on the front of the upper portion 41 of the lower guide member 22 and project forwardly of the guide member. The second connecting means 40 preferably consists of two forwardly directed arms 42 (only one shown) extending from the front of the upper portion 41 of the lower guide member 22 and spaced and angled to fit the standard bicycle seat mounting (not shown) on the top of the seat post SP. The arms 42 may have greater vertical dimensions than the standard seat rails provided on a bicycle seat to increase their strength, and they could be slotted, as shown at 44, to prevent inadvertent sliding disengagement of the suspension device from the seat post SP. The inner ends 46 of the arms 42 preferably are pivotably mounted onto a pivot 49 on the upper portion 41 of the lower guide member 22 and then clamped onto the pivot so that the suspension device 18 is mounted on the seat post SP at the desired angle of operation.

Figure 5:
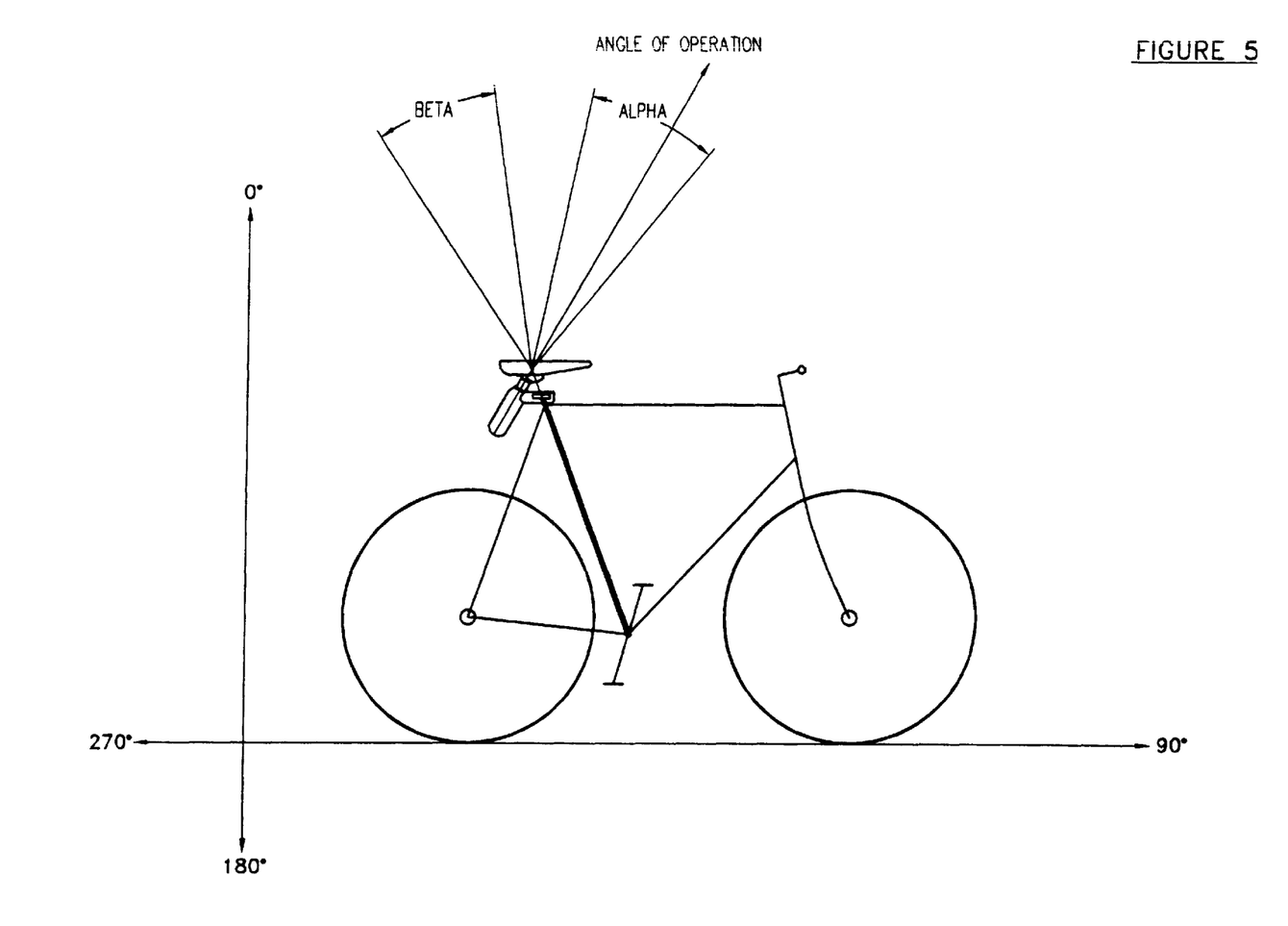
FIG. 5 is a side view similar to FIG. 4 showing angle determining factors alpha and beta.

The desired angle of operation depends on many variables such as the location of the seat; the weight, distribution, and geometry of the bicycle and cyclist; wheel size; type of road surface irregularity; and the effect of the mass of the cyclist on the points of contact other than the seat. However the most significant shock forces impact a seat suspension when the rear wheel encounters riding surface irregularities and it may be shown empirically that the majority of these shock forces impact the seat suspension at angles between ten and forty five degrees. As shown in FIG. 5, this range of angles is shown as "alpha". A suspension device having an angle of operation within this range is better able to isolate the torso of the cyclist from these shock forces.

Pedaling induced oscillation of a seat suspension is caused by cyclically repetitive forces generated by the legs when pedaling. Variables determining the pedaling forces include the positioning of the seat and the axle of the pedals, the radius of the pedal arms, the instantaneous position of the pedals and the relative magnitude of the forces acting on them. "Beta" is the range of angles of the pedaling forces and is typically between three hundred and twenty degrees and three hundred and forty degrees as shown in FIG. 5. A suspension device having an angle of operation within this range, as most prior art suspension devices mounted within the seat post have, is most prone to pedal induced oscillation.

In order to have improved shock isolating ability and be less prone to pedaling induced oscillation, a suspension apparatus should have its angle of operation chosen by considering both the "alpha" and "beta" range of angles. This chosen angle of operation should be well outside the "beta" range of angles and substantially within the "alpha" range of angles. Suspensions with operating angles chosen between fifteen and forty degrees fall within this range. While it may be preferable to have a steeper angle for road racing type bicycles and a lesser angle for off road type bicycles, the improved angle of operation would typically be about thirty degrees.

Referring again to FIGS. 1 and 3, travel limiting means 49 are provided to limit operational travel between the guide members 20, 22. The travel limiting means 49 can comprise a travel control pin 50 extending perpendicularly through the tubular wall 32 of the upper guide member 20 near its lower end. Resilient bumpers 52 are positioned at each cantilevered end of the travel control pin 50. Two longitudinal travel control slots 54 are located in opposite sides of the tubular wall 34 of the lower guide member 22. The bumpers 52 are constrained to occupy the travel control slots 54 thereby limiting operational travel between the guide members.

As may be seen in FIGS. 3 and 6A, elongated bearing means 55 are preferably provided to minimize operational friction of the suspension device. These bearing means 55 can comprise elongated bearing sets 56 disposed in rolling reception between longitudinal bearing tracks 58, 59 formed on the surfaces of the upper and lower guide members 20, 22 respectively. Each bearing set 56 has elongated races 60 holding rows of rolling surface bearings 62. The bearing sets 56 act together within the apparatus to resist lateral and rotational forces while allowing operational travel with minimal friction.

As may be seen in FIGS. 3 and 6B, each bearing set 56 is preferably retained in position between the guide members 20, 22 by means of a spring 63 attached near its middle to a finger 64 on the set 56. The first end 66 of the spring 63 is preferably attached to the travel control pin 50 of the upper guide member 20 and the second end 68 of the spring 63 is attached by a clip 70 within the upper end portion 41 of the lower guide member 22.

The springs 63 control creepage of the bearing sets 56 caused by gravitational and mechanical forces acting on them. Uncontrolled creepage of a bearing set increases friction and damages bearing surfaces as under certain conditions of operational travel the bearings are constrained to move slidably rather than rollably. In the spring positioned set, the bearing set is connected at a point along the length of the spring 63 near the middle so as to counteract the force of gravity on the set when the set is in its appropriate position. Should the set creep out of its appropriate position, the spring will provide a restorative force proportional to the degree of creepage.

Referring again to FIG. 2, cushioning means 72 are provided for cushioning movement of the upper and lower guide members 20, 22 toward each other, biasing them in an extended position. The cushioning means 72 can be a pneumatic spring means comprising a cushioning air chamber 74 formed by an end wall 76 in the tubular wall 32 of the upper guide member 20; the tubular wall 32; the head 80 of a piston 82 that enters the upper guide member 20 from its lower open end 26 and at least one piston seal 84. A rounded end 86 of the piston 82, opposite the piston head 80, can be located in a rounded depression 88 in the lower end 30 of the lower guide member 22. This mounting allows the piston 82 to be pivotably held in place in the depression 88 by air pressure in the cushioning air chamber 74 thereby allowing the piston's head 80 to orient itself so that only resilient piston seals 84 touch the tubular wall 32 of the upper guide member 20. The piston 80 may include a slot 90 permitting the travel control pin 50 to be located through the center of the upper guide member 20.

The suspension device 18 preferably includes an active spring linearity control system 92. In a preferred embodiment, the active control system comprises an air reservoir chamber 94 functionally connected through a normally open air-flow control valve 96 to the cushioning air chamber 74. The reservoir chamber 94 is preferably located in the upper end portion 37 of the upper guide member 20 between the end wall 76 and the closed upper end 24. A normally open control valve 96 mounted in the end wall 76, controls the air flow between the cushioning air chamber 74 and the reservoir chamber 94.

The control valve 96 preferably has a perforated ball housing 98 which houses a valve ball 100. The valve body 102, forming the ball housing 98, also forms an open, centered, upper annular seat 104 for seating the valve ball 100 when the valve closes. The valve body 102, valve ball 100, and seat 104 form the valve 96 which closes when the air flow from the cushioning chamber 74 to the reservoir chamber 94 through the normally open valve 96 exceeds a predetermined rate.

The active spring linearity control system allows the suspension device to have a more linear spring travel than would otherwise be practical. The reservoir chamber 94 increases the linearity of the cushioning means. This increased linearity improves the suspension device's shock isolating ability during normal riding conditions. The apparatus converts to a less linear mode during abnormal conditions that could potentially cause excessive travel or bottoming out of the device, such as may be caused by abnormally large shock forces acting on the device or cyclically repetitious forces at the frequency of resonance of the suspension system. The linearity control system anticipates potentially excessive operational travel by sensing high relative compressive velocity of the upper and lower guide members. High compressive velocity creates a correspondingly large rate of air flow through the normally open control valve 96 located between the cushioning air chamber 74 and the reservoir chamber 94, causing the valve 96 to close and remain closed as long as there is sufficient pressure differential between the chambers. The closed valve 96 decreases the cushioning means linearity thereby counteracting bottoming out of the device by rapidly increasing the cushioning means resistance to operational travel. The increased spring rate may also counteract excessive oscillatory travel of the device by raising the frequency of resonance of the suspension system.

A damping system may be included as part of the linearity control system. Allowing a restricted air flow between the chambers 74, 94 when the valve 96 is closed, dissipates excess potential energy stored by the cushioning means. This restricted flow may be achieved by the control valve 96, or by one or more separate orifices formed between the chambers such as the restrictive orifice 106 formed in the end wall 76.

Pre-tensioning means 108 to compensate for a cyclist's weight may be provided for the cushioning means. The pre-tensioning means can comprise an access valve 110 in the upper end portion 37 of the upper guide member 20 allows for the addition or removal of air depending on the rider's weight.

Figure 6:
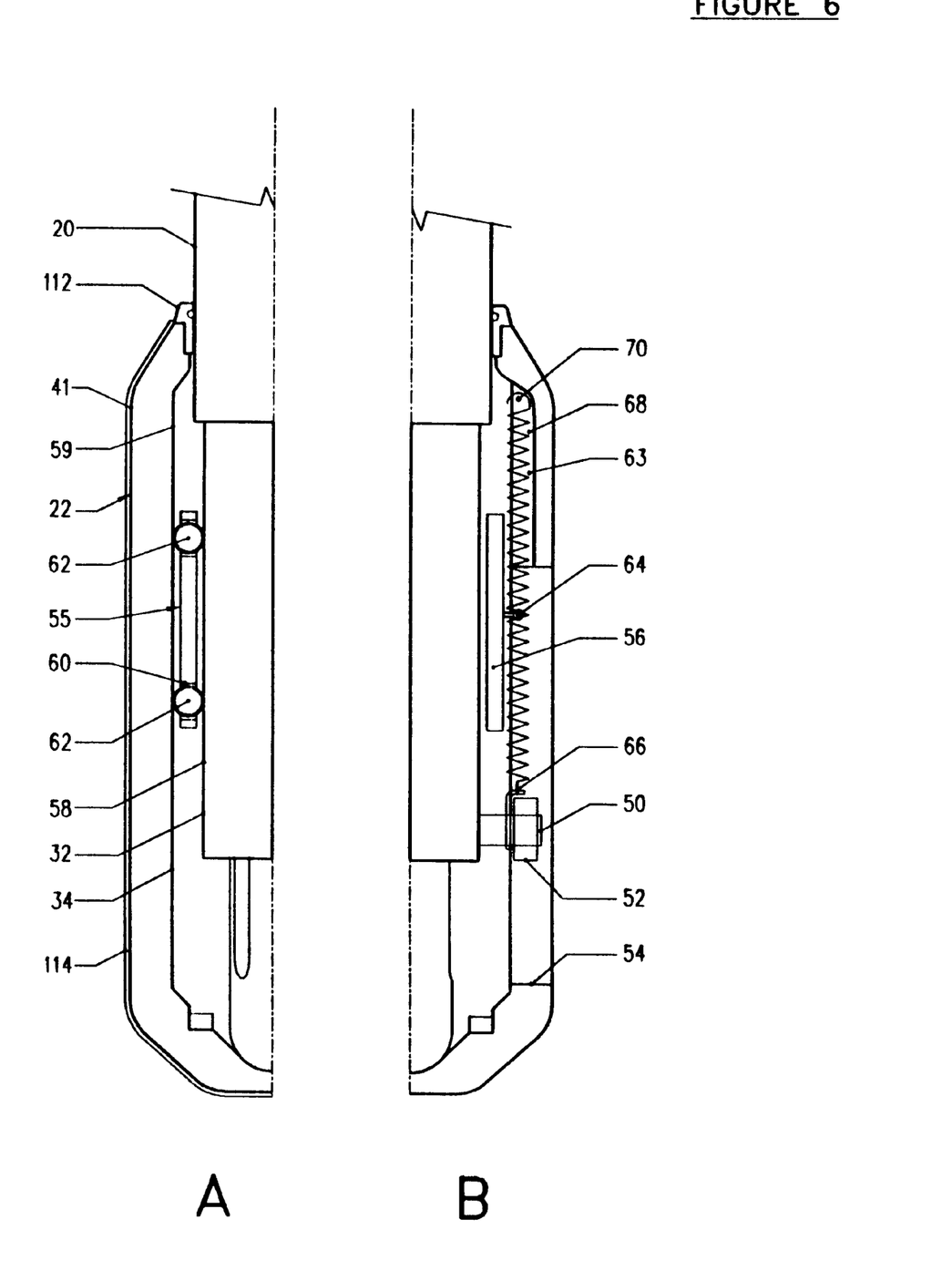
FIG. 6A is a sectional view, along line 6A—6A in FIG. 3, showing the bearings in the seat suspension device.
FIG. 6B is a sectional view, along line 6B—6B in FIG. 3, showing the spring control of the bearing races.

As may be seen in FIG. 6, protective sealing means can protect the bearing sets 56 and the piston seal 84 from external contamination and may comprise a scraper type seal 112 mounted near the top of the lower guide member 28 where the upper guide member 20 enters the lower guide member 22 and a protective outer casing 114 covering the exterior of lower guide member 22.

In use, the suspension device 18 is mounted on the top of a seat post SP by means of the second connecting means 40. The seat post SP is mounted in the seat post tube SPT in the bicycle frame BF. The second connecting means 40 is generally horizontal when the seat post SP is mounted in the seat post tube SPT. The seat post SP can be adjusted heightwise in the seat post tube SPT to adjust the height of the seat. The device 18 is mounted to have the longitudinal axis of the guide members 20, 22 extend at an angle (ninety minus "alpha") of between fifty degrees and seventy five degrees to the horizontal, sloping toward the front of the bicycle. The bicycle seat BS is mounted on top of the device 18 by means of the first connecting means 36, the seat generally horizontal and parallel to the second connecting means 40. The cushioning chamber 74 is then pressurized through the access valve 110, the reservoir chamber 94 also being pressurized through the open control valve 96. The chambers 74, 94 are pressurized enough so that a person sitting on the seat will cause the upper guide member 20 to move down into the second guide member 22. As the rider rides over small bumps, the lower guide member 22 moves up and down relative to the upper guide member 20 absorbing the bumps without transmitting them to the rider. The air within the cushioning chamber 74 is compressed as the lower guide member 22 rides up but the air is pushed up through the open valve 96 into the reservoir chamber 94 providing a spring system that is relatively linear. The cushioning means has a fairly long travel at a relatively low linear spring rate, giving the impression of floating over the small bumps. If a large bump is hit, the lower guide member 22 will move up and compress the air so quickly that it will close the valve 96 changing the resistance of the cushioning means and causing damping to occur.

Although only one embodiment of the present invention has been described and illustrated, the present invention is not limited to the features of this embodiment but includes all variations and modifications within the scope of the claims.

We claim:

1. A bicycle having a: rearwardly frame with an upwardly, slightly rearwardly, extending seat post tube; a front and rear wheel mounted on the front and rear of the frame; a bicycle seat; a suspension device for mounting the seat on the seat post tube; the device having: an upper tubular guide member having an upper portion and a lower portion; a lower tubular guide member having an upper portion and a lower portion; the lower portion of the upper guide member telescopically and non-rotatably mounted within the upper portion of the lower guide member; cushioning means between the upper and lower guide members for use in cushioning movement of the guide members toward each other; first connecting means mounted on top of the upper guide member, the first connecting means connecting the suspension device to the bicycle seat; second connecting means mounted on the upper portion of the lower guide member, the second connecting means extend forwardly generally horizontally from the suspension device to the seat post tube, and the upper portion of the suspension device, above the second connecting means, at an angle of between fifty and seventy degrees to the second connecting means.

2. A bicycle as claimed in claim 1 wherein the second connecting means comprise a pair of parallel arms with means at their front end retaining them on the seat post when connected thereto.

3. A bicycle as claimed in claim 2 wherein the arms are adjustably connected to the suspension device.

4. A suspension device adapted to be used in mounting a bicycle seat on a bicycle frame to cushion movement of the seat relative to the frame, the suspension device having: an upper tubular guide member having an upper portion and a lower portion; a lower tubular guide member having an upper portion and a lower portion; the lower portion of the upper guide member telescopically and non-rotatably mounted within the upper portion of the lower guide member; cushioning means between the upper and lower guide members for use in cushioning movement of the guide members toward each other; first connecting means mounted on top of the upper guide member, the first connecting means adapted to be used in connecting the suspension device to a bicycle seat; second connecting means mounted on the upper portion of the lower guide member and extending forwardly therefrom, the second connecting means adapted to be used in connecting the suspension device to a bicycle frame; the second connecting means adjustably mounted to the lower guide member, the upper guide member extending at an angle of between fifty degrees and seventy five degrees to the second connecting means so as to both absorb bumps from the rear tire and to minimize unwanted pedaling induced oscillations in the device when the device is used.

5. A suspension device as claimed in claim 4 including elongated bearing means mounted between the lower portion of the upper guide member and the upper portion of the lower guide member, the bearing means parallel with the longitudinal axis of the telescoped guide members.

6. A suspension device as claimed in claim 4 wherein the cushioning means comprises an air cushioning chamber formed between an inner wall in the upper guide member, and an upwardly projecting piston carried by the lower guide member, the piston entering the lower portion of the upper guide member.

7. A suspension device as claimed in claim 5 wherein the elongated bearing means has rolling surface bearings positioned by one or more races, each race retained in position by a spring attached at its approximate center to the race, the spring attached at its upper end to the upper guide member and at its lower end to the lower guide member.

8. A suspension device as claimed in claim 6 including pressure valve means for use in pressurizing the air cushioning chamber in dependence on the weight of the cyclist using the suspension device.

9. A suspension device as claimed in claimed in 6 wherein the piston has a rounded bottom end opposite the piston head, the bottom end supported in a rounded depression in the bottom of the lower guide member so that the piston head is self centering within the upper guide member.

10. A suspension device as claimed in claim 6 including an air reservoir chamber behind the inner wall in the upper guide member and normally open control valve means in the wall connecting the air reservoir and air cushioning chambers together.

11. A suspension device as claimed in claim 10 including closing means for closing the control valve means when the air flow from the air cushioning chamber to the air reservoir chamber exceeds a predetermined value.

12. A suspension device as claimed as claimed in claim 11 including a restricted passageway in the inner wall providing air flow between the air cushioning chamber and the air reservoir chamber to provide damping when needed.

13. A suspension device adapted to be used in mounting a bicycle seat on a bicycle frame to cushion movement of the seat relative to the frame, the suspension device having: an upper tubular guide member having an upper portion and a lower portion; a lower tubular guide member having an upper portion and a lower portion; the lower portion of the upper guide member telescopically and non-rotatably mounted within the upper portion of the lower guide member; cushioning means between the upper and lower guide members for use in cushioning movement of the guide members toward each other; first connecting means mounted on top of the upper guide member, the first connecting means adapted to be used in connecting the suspension device to a bicycle seat; second connecting means mounted on the upper portion of the lower guide member and extending forwardly therefrom, the second connecting means adapted to be used in connecting the suspension device to a bicycle frame; and including elongated bearing means mounted between the lower portion of the upper guide member and the upper portion of the lower guide member, the bearing means parallel with the long axis of the telescoped guide members; the elongated bearing means having rolling surface bearings positioned by one or more races, each race retained in position by a spring attached at its approximate center to the race, the spring attached at its upper end to the upper guide member and at its lower end to the lower guide member.

14. A suspension device adapted to be used in mounting a bicycle seat on a bicycle frame to cushion movement of the seat relative to the frame, the suspension device having; an upper tubular guide member having an upper portion and a lower portion; a lower tubular guide member having an upper portion and a lower portion; the lower portion of the upper guide member telescopically and non-rotatably mounted within the upper portion of the lower guide member; cushioning means between the upper and lower guide members for use in cushioning movement of the guide members toward each other; said cushioning means comprising an air cushioning chamber formed between an inner wall in the upper guide member, and an upwardly projecting piston carried by the lower guide member, the piston entering the lower portion of the upper guide member; an air reservoir chamber behind the inner wall in the upper guide member and normally open control valve means in the wall connecting the air reservoir and air cushioning means together; pressure valve means for use in pressuring the air cushioning chamber in dependence on the weight of the cyclist using the suspension device; first connecting means mounted on top of the upper guide member, the first connecting means adapted to be used in connecting the suspension device to a bicycle seat; and second connecting means mounted on the upper portion of the lower guide member and extending forwardly therefrom, the second connecting means adapted to be used in connecting the suspension device to a bicycle frame.

15. A suspension device as claimed in claim 14 wherein the second connecting means is adjustably mounted to the lower guide member, the upper guide member extending at an angle of between fifty degrees and seventy five degrees to the second connecting means.

16. A suspension device as claimed in claim 14 including closing means for closing the control valve means when the air flow from the air cushioning chamber to the air reservoir chamber exceeds a predetermined value.

17. A suspension device as claimed in claim 15 including elongated bearing means mounted between the lower portion of the upper guide member and the upper portion of the lower guide member, the bearing means parallel with the long axis of the telescoped guide members.

18. A suspension device as claimed as claimed in claim 16 including a restricted passageway in the inner wall providing air flow between the air cushioning chamber and the air reservoir chamber to provide damping when needed.

19. A suspension device adapted to be used in mounting a bicycle seat on a bicycle frame to cushion movement of the seat relative to the frame, the suspension device having; an upper tubular guide member having an upper portion and a lower portion; a lower tubular guide member having an upper portion and a lower portion; the lower portion of the upper guide member telescopically and non-rotatably mounted within the upper portion of the lower guide member; cushioning means between the upper and lower guide members for use in cushioning movement of the guide members toward each other; said cushioning means comprising an air cushioning chamber formed between an inner wall in the upper guide member, and an upwardly projecting piston carried by the lower guide member, one end of the piston entering the lower portion of the upper guide member, the piston having a rounded bottom end opposite the one end, the bottom end supported in a rounded depression in the bottom of the lower guide member so that the one end of the piston is self centering within the upper guide member; first connecting means mounted on top of the upper guide member, the first connecting means adapted to be used in connecting the suspension device to a bicycle seat; and second connecting means mounted on the upper portion of the lower guide member and extending forwardly therefrom, the second connecting means adapted to be used in connecting the suspension device to a bicycle frame.

20. A suspension device as claimed in claim 17 wherein the second connecting means is adjustably mounted to the lower guide member, the upper guide member extending at an angle of between fifty degrees and seventy five degrees to the second connecting means.

21. A suspension device as claimed in claim 20 including elongated bearing means mounted between the lower portion of the upper guide member and the upper portion of the lower guide member, the bearing means parallel with the long axis of the telescoped guide members.

* * * * *

UNITED STATES PATENT AND TRADEMARK OFFICE
CERTIFICATE OF CORRECTION

PATENT NO. : 6,070,895
DATED : June 6, 2000
INVENTOR(S) : William Michael Newman, et. al.

It is certified that error appears in the above-identified patent and that said Letters Patent is hereby corrected as shown below:

Change claim 1 to claim 43.
Change claim 4 to claim 42.

Signed and Sealed this

Seventeenth Day of July, 2001

*Attest:*

NICHOLAS P. GODICI
*Attesting Officer*   *Acting Director of the United States Patent and Trademark Office*